United States Patent [19]

Sukegawa

[11] Patent Number: 5,184,235

[45] Date of Patent: Feb. 2, 1993

[54] ACTIVE MATRIX LIQUID CRYSTAL DISPLAY PANEL WITH AN ELECTROSTATIC PROTECTION CIRCUIT

[75] Inventor: Osamu Sukegawa, Tokyo, Japan

[73] Assignee: NEC Corporation, Japan

[21] Appl. No.: 758,262

[22] Filed: Aug. 26, 1991

Related U.S. Application Data

[63] Continuation of Ser. No. 661,225, Feb. 27, 1991, abandoned, which is a continuation of Ser. No. 438,766, Nov. 17, 1989, abandoned.

[30] Foreign Application Priority Data

Nov. 18, 1988 [JP] Japan ................................. 63-291608

[51] Int. Cl.⁵ .............................................. G02F 1/13
[52] U.S. Cl. ......................................... 359/60; 359/54
[58] Field of Search ..................... 350/333, 332, 336; 359/60, 54

[56] References Cited

U.S. PATENT DOCUMENTS

| | | | |
|---|---|---|---|
| 4,523,811 | 6/1985 | Ota | 350/333 |
| 4,589,733 | 5/1986 | Yaniv et al. | 350/333 |
| 4,666,252 | 5/1987 | Yaniv et al. | 350/333 |
| 4,709,992 | 12/1987 | Ueno | 350/333 |
| 4,728,175 | 3/1988 | Baron | 350/333 |
| 4,836,650 | 6/1989 | Morin et al. | 350/333 |

FOREIGN PATENT DOCUMENTS

63-303322 12/1988 Japan ................................. 350/333

OTHER PUBLICATIONS

Suzuki, M. et al., *Japan Display '86*, "A New Active Diode Matrix LCD Using Off-Stoichiometric SiNx Layer", (1986), pp. 72–74.

Togashi, S. et al., *Proceedings of the SID*, "An LC-TV Display Controlled by a-Si Diode Rings", vol. 26/1 (1985), pp. 9–15.

*Primary Examiner*—William Mintel
*Assistant Examiner*—S. V. Clark
*Attorney, Agent, or Firm*—Ostrolenk, Faber, Gerb & Soffen

[57] ABSTRACT

An active matrix liquid crystal display panel includes a matrix of pixel electrodes, data lines connected to the pixel electrodes by first MIM diodes, respectively, address lines, a liquid crystal layer inserted between the pixel electrodes and the address lines, a wiring and second protective MIM diodes connected between the wiring and the data lines.

9 Claims, 4 Drawing Sheets

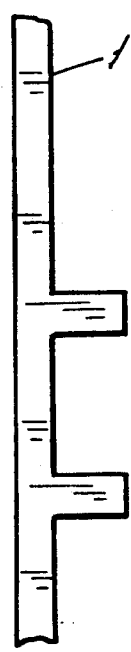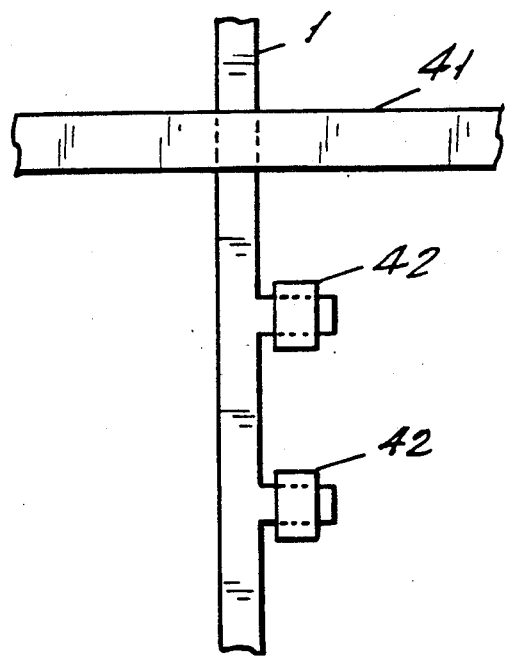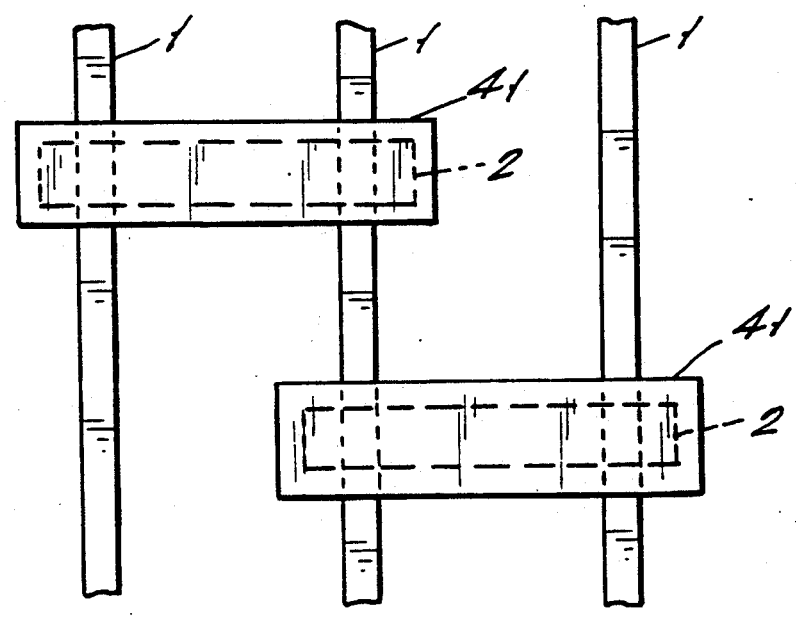

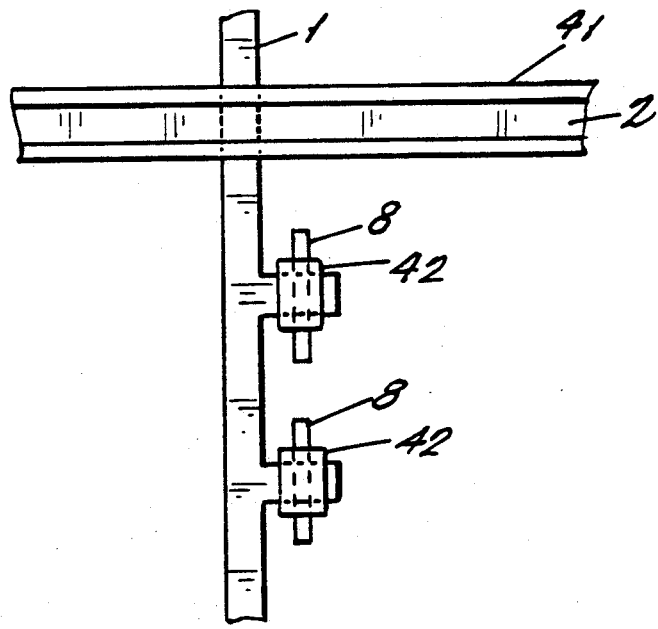
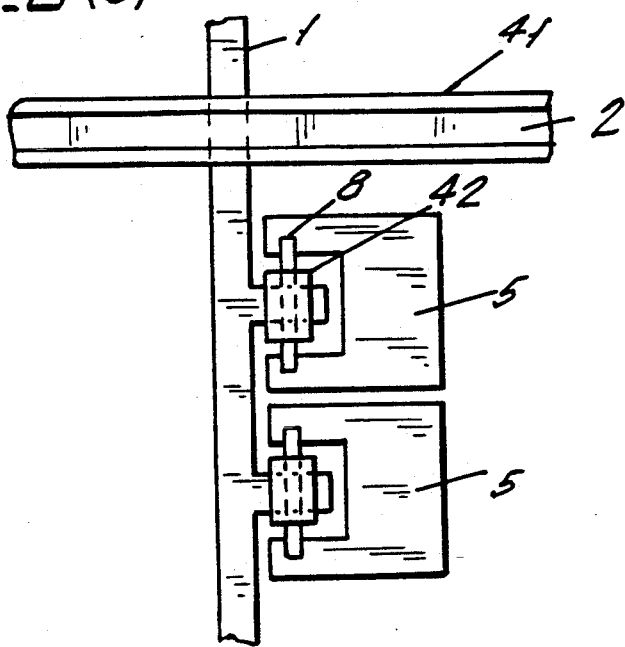

ACTIVE MATRIX LIQUID CRYSTAL DISPLAY PANEL WITH AN ELECTROSTATIC PROTECTION CIRCUIT

This is a continuation of application Ser. No. 07/661,225 filed on Feb. 27, 1991, which is a continuation of application Ser. No. 07/438,766, filed Nov. 17, 1989 both now abandoned.

BACKGROUND OF THE INVENTION

1. Field of the Invention

The present invention relates to an active matrix liquid crystal display panel and particularly, to an MIM (Metal-Insulator-Metal) diode-type active matrix liquid crystal display panel having an electrostatic protection circuit.

2. Description of the Related Art

Conventionally, in the active matrix display panel, pixel electrodes are electrically connected by diode elements of data lines which are vertically wired, and there exists a space between the data lines to ensure electrical insulation as shown in "A New Active Diode Matrix LCD Using Off-Stoichiometric SiNx Layer", JAPAN DISPLAY '86(1986), pp. 72-74 and "AN LC TV DISPLAY CONTROLLED BY a-Si DIODE RINGS", Proceedings of the SID, Vol. 26/1, 1985, pp. 9-15.

The conventional diode-type active matrix display panel as mentioned above has its data lines electrically insulated from each other. Therefore, a high voltage is electrostatically applied between adjacent data lines in the processes such as cutting process during panel formation and a connection process of driving IC circuits after the panel formation, causing a dielectric breakdown or destruction of diode elements and the like.

SUMMARY OF THE INVENTION

Therefore, an object of the present invention is to provide an active matrix liquid crystal display panel having a circuit which protects the data lines from a dielectric breakdown caused by electrostatic charges.

The diode active matrix display panel of the present invention includes a diode element which is connected between a data line and a wiring and is located outside the display area.

According to the present invention, a diode is provided in a location outside the display area of a diode-type active matrix display panel and data lines are connected to each other through diodes so that a charge up of data lines can be restricted. As a result, an effect of preventing the destruction of an element by electrostatic charges can be attained.

BRIEF DESCRIPTION OF THE DRAWINGS

The above and further objects, features and advantages of the present invention will become more apparent from the following detailed description taken in conjunction with the accompanying drawings, wherein:

FIGS. 5(a) to 5(d) are plan view for explaining a manufacturing method of the liquid crystal display panel shown in FIG. 1; and FIG. 6 is a plan view for expalaining a second embodiment of the present invention.

DESCRIPTION OF THE PREFERRED EMBODIMENTS

Figure 1:
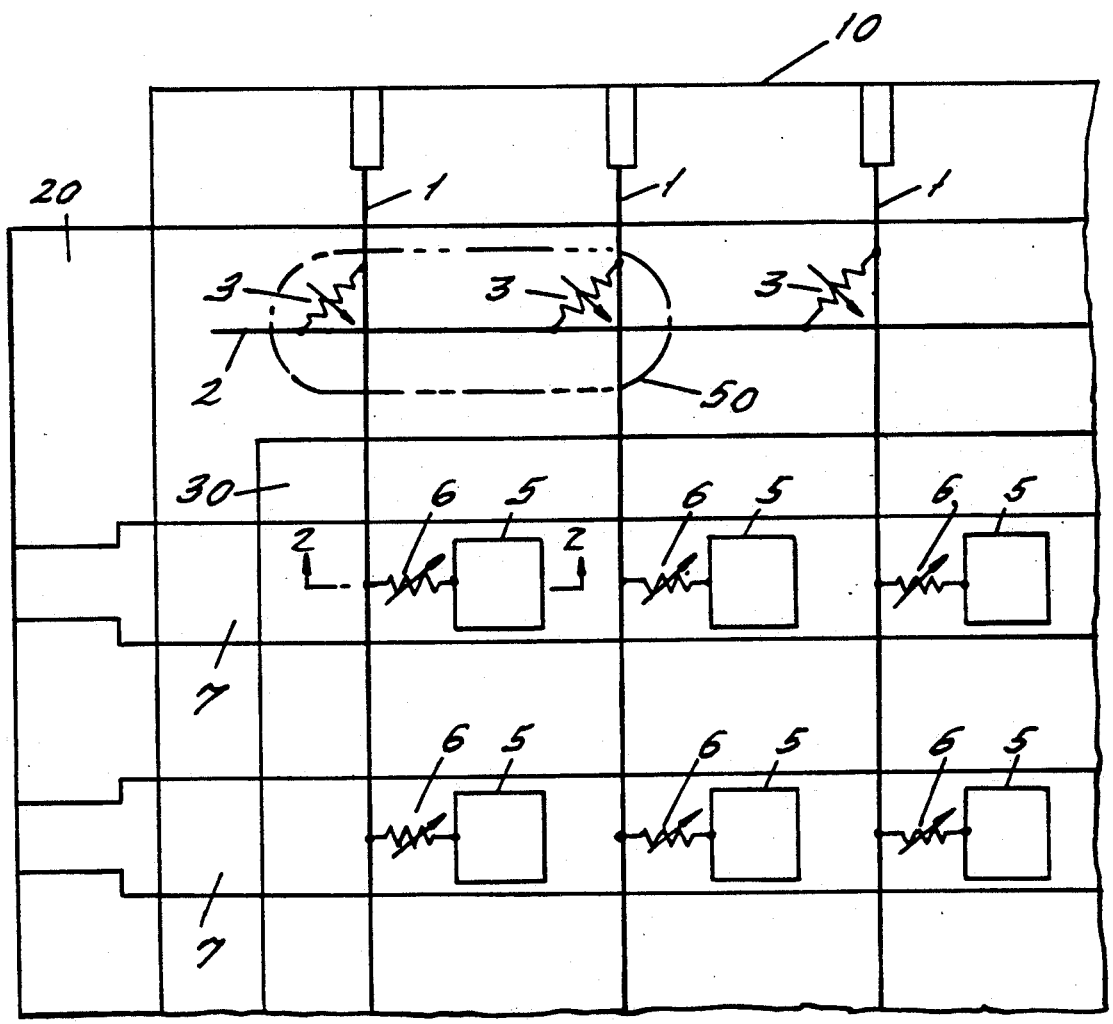
FIG. 1 is a plan view for explaining a first embodiment of the present invention.
Figure 4:
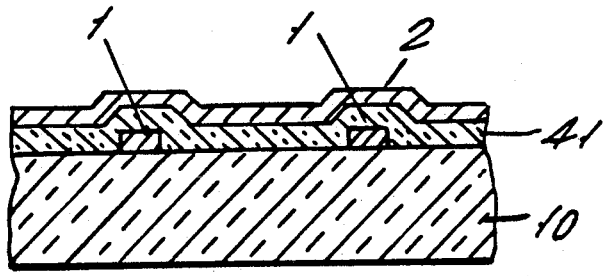
FIG. 4 is a sectional view taken along the line 4—4 in FIG. 3.

Referring to FIGS. 1 and 4 on a lower glass substrate 10, are formed a plurality of pixel electrodes 5 of conductive material organized in a matrix form. Along every column of pixel electrodes 5, data lines 1 are disposed which are connected to pixel electrodes 5 through metal-inusulator-metal (MIM) diodes 6. An upper glass substrate 20 having a plurality of address lines 7 which run over every row of pixel electrodes 5 is covered on the lower glass substrate 10.

The region having the matrix of pixel electrodes 5 is defined as a display portion 30. The gap between the lower and upper glass substrates 10 and 20 are filled with liquid crystal (see FIG. 2), serving to display character or graphic patterns.

On the lower glas substrate 10 is formed an additional wiring 2 which is designed to be connected to a reference voltage such as ground or another fixed voltage. The wiring 2 crosses all data lines 1. At every crossing point of the wiring 2, additional MIM diodes 3 are formed to connect the wiring 2 to the data lines 1.

The data lines 1 are formed with Cr films of 100 nm that are located on the lower glass substrate 10. A silicon nitride film 42 is formed to partially cover the data lines in the display portion 30. Another silicon nitride film 41 is formed to overlap the data lines 1 outside the display portion 30. These silicon nitride films 41 and 42 may be of the same material, produced without any additional process steps.

Figure 2:
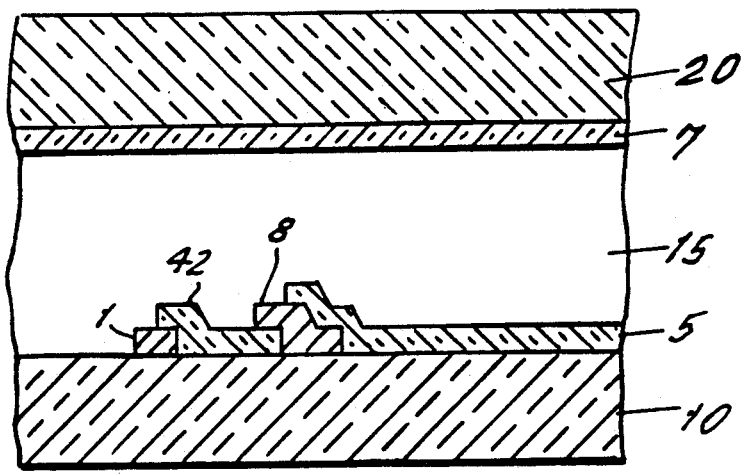
FIG. 2 is a sectional view taken along the line 2—2 in FIG. 1.

Referring to FIG. 2, in the display portion 30 upper electrodes 8 of metal are disposed to partially cover the silicon nitride film 42. Thereafter the pixel electrodes 5 are formed. The data lines 1, the silicon nitride film 42 and the upper electrodes 8 form MIM diodes 6, each of which connects a data line 1 with a pixel electrode 5. Each of the address lines 7 is formed on the lower surface of the upper glass substrate 20 to cover each row of pixel electrodes 5. Liquid crystal fills the gap between the upper and lower glass substrates 20 and 10.

Figure 3:
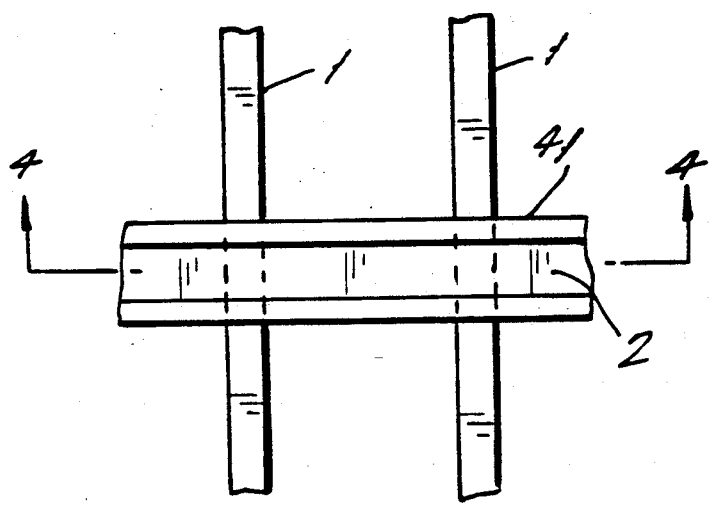
FIG. 3 is a plan view for explaining the portion 50 in FIG. 1.

Referring to FIGS. 3 and 4, at the peripheral portion outside the display portion 30 of the lower glass substrate 10, the silicon nitride film 41 is formed to cover parts of all the data lines 1. Thereafter, the wiring 2 made of Cr having a thickness of 50 nm is formed on the silicon nitride film 41. The parts of data lines 1, the silicon nitride film 41 and the wiring form a plurality of MIM diodes 3 which serve to connect the data lines 1 to the wiring 2.

The silicon nitride film 41 and the silicon nitride film 42 may be formed of a material of the same composition and may be made of a non-stoichiometric silicon nitride having an excessive amount of silicon. These silicon nitride films 41 and 42 may be deposited simultaneously to omit additional process steps for the electrostatic protection element (MIM diodes 3).

The wiring 2 is separate from the data lines 1 and the pixel electrodes 5, except for the connection through the MIM diodes 3. The wiring 2 may be supplied with a reference voltage such as ground through a terminal formed at the periphery of the lower glass substrate 10.

Referring to FIG. 5(a), a Cr film of 100 nm is formed on a glass substrate by sputtering, and a data line 1 is formed by patterning. Then, referring to FIG. 5(b), a silicon nitride of 1500 Å having an excessive silicon is formed by a plasma CVD method. The required conditions vary according to the device to be used, but typically, a plasma CVD process with SiH$_4$ and N$_2$ gases having such values as SiH$_4$ = 50 sccm, N$_2$ = 200 sccm and the like is used at a substrate temperature of approximately 350° C. Subsequently, the silicon nitride film is patterned to form a stripe pattern of silicon nitride film 41 outside the display area and rectangular patterns of silicon nitride films 42 inside the display area. Next, referring to FIG. 5(c) and FIG. 5(d), upper electrodes 8 and wiring 2 of Cr of 1,000 Å thickness and pixel electrodes of indium-tin-oxide (ITO) of 500 Å thickness are formed by sputtering and patterning. Then, annealing at a temperature of approximately 300° C. is performed for one hour at an N$_2$ atmosphere.

Referring to FIG. 6, wirings 2 connects adjacent data lines 1 with a diode. Consequently, according to this embodiment, any short circuit does not take place between the data lines unless two of the diodes are simultaneously conducted, providing an advantage that the occurrence of a short circuit failure of the data lines caused by a defective protection element is diminished.

In the foregoing, the MIM diodes 3 as protective diodes are connected to the data lines to protect these data lines, but it is possible to be connected to the address lines to protect these address lines.

What is claimed is:

1. An active matrix liquid crystal display panel, comprising:
    a lower substrate having a display portion and a separate periphery portion;
    a plurality of pixel electrodes formed in said display portion on said lower substrate organized in a matrix including columns and rows;
    a plurality of first lines formed on said lower substrate traversing said display portion and extending to said periphery portion, said first lines being connected respectively to said pixel electrodes of each column by first diodes;
    an upper substrate;
    a plurality of second lines formed on a lower surface of said upper substrate, said second lines being provided respectively over each row of said pixel electrodes;
    liquid crystal inserted between said display portion of said lower substrate and said lower surface of said upper substrate;
    a wiring formed on the periphery portion of said lower substrate separately from said pixel electrodes and said first lines, said wiring being being formed to cross said first lines; and
    a plurality of second diodes connected between said wiring and said first lines.

2. An active matrix liquid crystal display panel as claimed in claim 1, wherein said first lines are data lines and said second lines are address lines.

3. An active matrix liquid crystal display panel as claimed in claim 2, wherein said first diodes and said second diodes are metal-insulator-metal diodes formed by interposing an insulator between metal layers.

4. An active matrix liquid crystal display panel as claimed in claim 3, wherein said insulator of said metal-insulator-metal diodes is silicon nitride.

5. An active matrix liquid crystal display panel as claimed in claim 4, wherein said silicon nitride for said first diode is the same position as for said second diode.

6. An active matrix liquid crystal display panel, comprising:
    a lower substrate having a display portion and a separate periphery portion;
    a matrix of pixel electrodes formed in said display portion of said lower substrate and organized in rows and columns;
    data lines formed on said lower substrate along columns of said pixel electrodes to traverse said display portion and to extend to said periphery portion, said data lines being connected respectively to said pixel electrodes of each column through first metal-insulator-metal diodes, respectively;
    an upper substrate;
    address lines formed on a lower surface of said upper substrate, said address lines being provided respectively over each row of said pixel electrodes;
    liquid crystal inserted between said lower surface of said upper substrate and said display portion of said lower substrate;
    a wiring formed on said lower substrate separately from said pixel electrodes and said data lines, said wiring being formed to cross said data lines at said periphery portion; and
    second metal-insulator-metal diodes formed on said lower substrate, each one of said second metal-insulator-metal diodes being connected between said wiring and each one of said data lines, respectively.

7. An active matrix liquid crystal display panel as claimed in claim 6, wherein said first and second metal-insulator-metal diodes are composed of two metal electrodes and a silicon nitride film interposed between said two metal electrodes, said silicon nitride film of said first and second metal-insulator-metal diodes being insulators having the same composition.

8. An active matrix liquid crystal display panel, comprising:
    a lower substrate having a display portion and a separate periphery portion;
    a matrix of pixel electrodes formed in said display portion of said lower substrate and organized in rows and columns;
    data lines formed on said lower substrate to traverse said display portion and to extend to said periphery portion, said data lines being connected to said pixel electrodes of each column by first metal-insulator-metal diodes, respectively;
    an upper substrate;
    address lines formed on a lower surface of said upper substrate, said address lines being provided respectively over each row of said pixel electrodes;
    liquid crystal inserted between said lower surface of said upper substrate and said display portion of said lower substrate; and
    second metal-insulator-metal diodes formed on said lower substrate, said data lines being connected to each other through said second metal-insulator-metal diodes.

9. An active matrix liquid crystal display panel as claimed in claim 8, wherein said first and second metal-insulator-metal diodes are diodes formed by interposing silicon nitride films between metal electrodes, and said silicon nitride films of said first and second metal-insulator-metal diodes having same compositions.

* * * * *